US012473634B2

(12) United States Patent
Kalnins

(10) Patent No.: US 12,473,634 B2
(45) Date of Patent: Nov. 18, 2025

(54) METHOD FOR SYNTHESIS OF GRAPHENE AND OTHER CARBON NANOMATERIALS ON A FERROMAGNETIC SUBSTRATE IN THE AMBIENT ATMOSPHERE

(71) Applicant: Viesturs Kalnins, Liepaja (LV)

(72) Inventor: Viesturs Kalnins, Liepaja (LV)

( * ) Notice: Subject to any disclaimer, the term of this patent is extended or adjusted under 35 U.S.C. 154(b) by 0 days.

(21) Appl. No.: 18/260,785

(22) PCT Filed: Jan. 18, 2022

(86) PCT No.: PCT/LV2022/050001
§ 371 (c)(1),
(2) Date: Jul. 9, 2023

(87) PCT Pub. No.: WO2022/158958
PCT Pub. Date: Jul. 28, 2022

(65) Prior Publication Data
US 2024/0327974 A1    Oct. 3, 2024

(30) Foreign Application Priority Data
Jan. 24, 2021 (LV) .......................... LVP2021000003

(51) Int. Cl.
C23C 16/26 (2006.01)
C01B 32/186 (2017.01)
C23C 16/46 (2006.01)

(52) U.S. Cl.
CPC ............ *C23C 16/26* (2013.01); *C01B 32/186* (2017.08); *C23C 16/463* (2013.01)

(58) Field of Classification Search
CPC ...................................... C23C 16/26
See application file for complete search history.

(56) References Cited

U.S. PATENT DOCUMENTS

2014/0256121 A1\* 9/2014 Radovanov ......... H01L 21/2658
438/513
2021/0057335 A1\* 2/2021 Yang ................... H01L 23/5226

OTHER PUBLICATIONS

Wang et al., "Electromagnetic induction heating for single crystal graphene growth: morphology control by rapid heating and quenching," 2015, Scientific Reports 5 p. 9034. (Year: 2015).\*
Seo, D., Pineda, S., Fang, J. et al. Single-step ambient-air synthesis of graphene from renewable precursors as electrochemical genosensor. Nat Commun, p. 14217, 2017.
Wu, C., Li, F., Chen, W. et al. Electromagnetic induction heating for single crystal graphene growth: morphology control by rapid heating and quenching. Sci Rep, p. 9034, 2015.

\* cited by examiner

*Primary Examiner* — Robert A Vetere

(57) ABSTRACT

The presented invention relates to the graphene and other carbon nanomaterial synthesis which requires a metal substrate-catalyst, elevated temperature and carbon precursors. The method for the synthesis of graphene and other carbon nanomaterials on a ferromagnetic substrate in the ambient atmosphere includes the following steps: 1) introducing a ferromagnetic substrate into a closed chamber having an ambient atmosphere; 2) applying a carbon precursor to said substrate; 3) heating the substrate by electromagnetic induction, whereby the carbon precursor is evaporated and/or thermally decomposed; 4) igniting the carbon precursor; 5) cooling the substrate. The carbon precursor can be a single chemical or a mixture of various different carbon precursors.

2 Claims, 1 Drawing Sheet

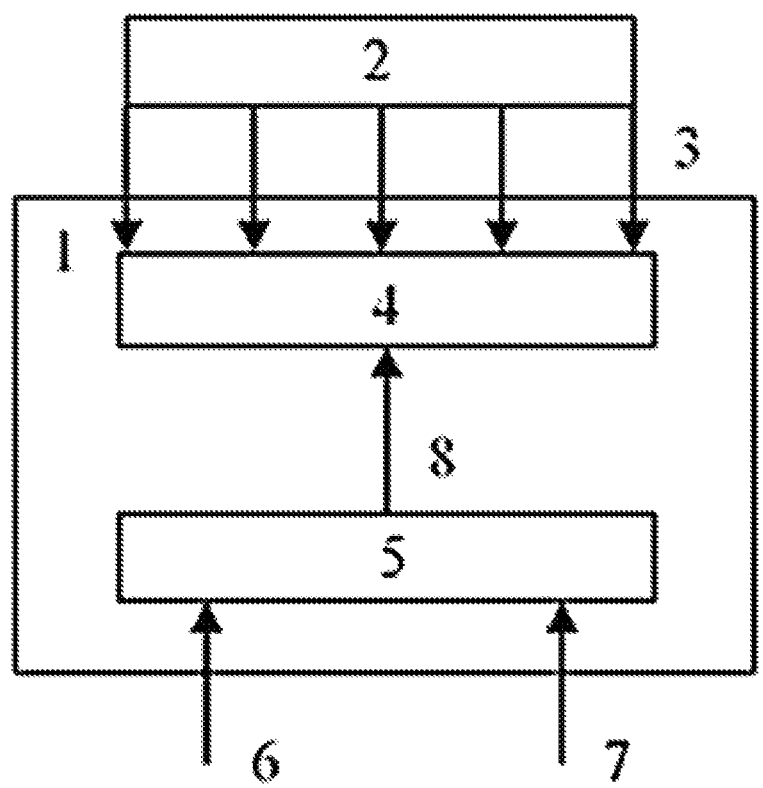

METHOD FOR SYNTHESIS OF GRAPHENE AND OTHER CARBON NANOMATERIALS ON A FERROMAGNETIC SUBSTRATE IN THE AMBIENT ATMOSPHERE

TECHNICAL FIELD

The invention relates to the field of nanotechnology—the production of nanomaterials. It can be used for production of graphene and other carbon nanomaterials where metal substrate-catalyst, temperature and carbon precursors are required, and for coating objects with such nanomaterials.

BACKGROUND ART

Various graphene and other carbon nanomaterial synthesis methods are known where metal substrate is used as a catalyst. Chemical vapour deposition methods using electromagnetic induction are somewhat similar to the proposed method. For example, the method described in the source [NPL2]. However, these methods do not differ much from the ordinary chemical vapour deposition methods, as in both cases, vacuum and gaseous carbon precursors are needed. The only similarity to the proposed method is substrate heating by electromagnetic induction.

The physical vapour deposition methods are a bit similar as well, but they need vacuum and the precursor is evaporated without the involvement of the combustion process.

The closest to the proposed method is the one-step method for synthesis of graphene from renewable precursors in the ambient atmosphere as proposed in the source [NPL1]. During the implementation of this method, the sequence of actions is as follows: 1) a nickel substrate and a liquid organic carbon precursor (soybean oil) are placed in a closed chamber in the ambient atmosphere; 2) The chamber heats up, subsequently heating the substrate and thermally decomposing the organic precursor; 3) The gases produced by the thermal decomposition come into contact with the hot substrate; 4) The substrate is rapidly cooled. The disadvantage of this method is the large amount of gases that must be produced in order to eliminate the oxygen in the chamber either by chemical reactions or by mechanical expulsion of atmosphere from the chamber. This makes the use of high carbon solubility metals such as iron or steel problematic, thus leading to the use of traditional but more expensive substrates such as nickel or copper. In addition, heating the entire chamber is a time-consuming and energy-intensive process-similar to chemical vapour deposition methods.

DISCLOSURE OF INVENTION

The aim of the proposed method is to make the process of graphene and other carbon nanomaterial synthesis simpler, faster and more energy efficient and to allow the use of any ferromagnetic substrate and any type of carbon precursor, including liquid and solid. To do this, the following steps are performed during the implementation of the proposed method: 1) a ferromagnetic substrate is introduced in a closed chamber in the ambient atmosphere; 2) a carbon precursor is introduced in the same chamber; 3) the substrate is heated up by electromagnetic induction; 4) the carbon precursor is ignited. 5) at the end of combustion, when the flame goes out due to lack of oxygen, heating of the carbon precursor continues until it evaporates or thermally decomposes; 6) gases produced by the carbon precursor come into contact with the hot substrate; 7) the substrate is cooled.

BRIEF DESCRIPTION OF DRAWINGS

A schematic example of a device for the implementation of the proposed method is shown in [FIG. 1]. The elements shown are following: closed chamber (1), induction heating coil (2), electromagnetic induction (3), substrate holder (4), carbon precursor supply means (5), ignition means (6), thermal energy supply means (7), gases produced by the carbon precursor (8).

FIG. 1

FIG. 1 illustrates a schematic example of a device for the implementation of the proposed method.

BEST MODE FOR CARRYING OUT THE INVENTION

In a case of graphene synthesis by using steel as substrate and ethanol as carbon precursor, the device works as follows: a steel substrate held by substrate holder (4) and a carbon precursor supplied by carbon precursor supply means (5) are introduced in a closed chamber (1). In this case, the carbon precursor is a single chemical—ethanol. However, the carbon precursor can also be a mixture of various different carbon precursors with the aim to fine-tune the overall performance—for example, one chemical in the mixture is better at combustion, but other—better at evaporation. The amount of ethanol used is determined by the ability of the ethanol to consume all of the oxygen in the chamber by burning while still being able to generate sufficient vapour to cover the entire surface of the substrate. In the next step, Foucault currents are induced in the substrate by the use of induction heating coil (2). By doing this, the substrate is heated to a temperature that dissolves the existing layer of natural metal oxide covering the surface. When the substrate has reached this temperature and the natural oxide layer has disappeared, the ethanol is ignited by the ignition means (6), consuming all the oxygen in the chamber. When all the oxygen has been consumed, the remaining amount of ethanol continues to heat by the thermal energy supply means (7) until it evaporates. Produced gas-ethanol vapor (8) rises up to the hot substrate held by substrate holder (4) and a reaction takes place. The reaction time is chosen to be as short as possible, but long enough for carbon atoms to be able to diffuse into the substrate. Then the induction coil (2) is switched off, resulting in rapid cooling of the substrate. The carbon atoms diffused in the substrate come to the surface and form graphene clusters.

INDUSTRIAL APPLICABILITY

The invention can be used for production of graphene and other carbon nanomaterials where metal substrate-catalyst, temperature and carbon precursors are required, and for coating objects with such nanomaterials.

CITATION LIST

Citation List follows:

Non Patent Literature

NPL 1: Seo, D., Pineda, S., Fang, J. et al. Single-step ambient-air synthesis of graphene from renewable precursors as electrochemical genosensor. Nat Commun 8, 14217 (2017).

NPL 2: Wu, C., Li, F., Chen, W. et al. Electromagnetic induction heating for single crystal graphene growth: morphology control by rapid heating and quenching. Sci Rep 5, 9034 (2015).

The invention claimed is:

1. A method for the synthesis of graphene or other carbon nanomaterials on a ferromagnetic substrate in an ambient atmosphere, the method comprising the steps of:
   1) Introducing a ferromagnetic substrate into a closed chamber having an ambient atmosphere;
   2) Applying a carbon precursor to said substrate;
   3) heating the substrate by electromagnetic induction, whereby the carbon precursor is evaporated and/or thermally decomposed;
   4) igniting the carbon precursor; and
   5) cooling the substrate.

2. A method for the synthesis of graphene or other carbon nanomaterials according to claim 1, wherein the carbon precursor is a mixture of two or more different carbon precursors.

* * * * *